US009125475B2

(12) United States Patent
Garza, Jr.

(10) Patent No.: US 9,125,475 B2
(45) Date of Patent: Sep. 8, 2015

(54) ELECTRONIC DEVICE HOLDER

(71) Applicant: Gerardo Garza, Jr., Houston, TX (US)

(72) Inventor: Gerardo Garza, Jr., Houston, TX (US)

( * ) Notice: Subject to any disclaimer, the term of this patent is extended or adjusted under 35 U.S.C. 154(b) by 38 days.

(21) Appl. No.: 14/216,817

(22) Filed: Mar. 17, 2014

(65) Prior Publication Data

US 2014/0312090 A1    Oct. 23, 2014

Related U.S. Application Data

(60) Provisional application No. 61/802,137, filed on Mar. 15, 2013.

(51) Int. Cl.
| | |
|---|---|
| *A45F 5/00* | (2006.01) |
| *F16M 13/04* | (2006.01) |
| *F16M 11/04* | (2006.01) |
| *F16M 11/14* | (2006.01) |
| *F16M 11/20* | (2006.01) |
| *F16M 11/28* | (2006.01) |
| *F16M 13/02* | (2006.01) |
| *H04B 1/3877* | (2015.01) |
| *H04M 1/05* | (2006.01) |

(52) U.S. Cl.
CPC ............... *A45F 5/00* (2013.01); *F16M 11/041* (2013.01); *F16M 11/14* (2013.01); *F16M 11/2021* (2013.01); *F16M 11/28* (2013.01); *F16M 13/022* (2013.01); *F16M 13/04* (2013.01); *H04B 1/3877* (2013.01); *H04M 1/05* (2013.01); *A45F 2200/0516* (2013.01); *A45F 2200/0525* (2013.01); *Y10S 224/929* (2013.01)

(58) Field of Classification Search
CPC .............. A45F 5/04; A45F 2200/0516; A45F 2200/0508; A45F 2200/0525; A45F 2200/0533; F16M 13/04

USPC ......... 224/929, 623, 625, 257, 259, 270, 197, 224/198, 199, 200
See application file for complete search history.

(56) References Cited

U.S. PATENT DOCUMENTS

| | | | | |
|---|---|---|---|---|
| 817,207 | A * | 4/1906 | Wheeler | 224/185 |
| 1,018,771 | A * | 2/1912 | Neuburger | 359/410 |
| 2,603,134 | A * | 7/1952 | Burnam | 224/185 |
| 2,636,822 | A * | 4/1953 | Anderson | 224/185 |
| 4,327,986 | A * | 5/1982 | Carter | 396/423 |
| 4,526,308 | A * | 7/1985 | Dovey | 224/265 |
| 4,637,536 | A * | 1/1987 | Wong | 224/262 |
| 4,687,309 | A * | 8/1987 | Breslau | 396/423 |
| 6,359,609 | B1 * | 3/2002 | Kuenster et al. | 345/156 |
| 6,764,231 | B1 * | 7/2004 | Shubert | 396/419 |
| 7,191,923 | B1 * | 3/2007 | Kundig | 224/257 |
| D549,709 | S * | 8/2007 | Richter | D14/447 |

(Continued)

FOREIGN PATENT DOCUMENTS

| | | | |
|---|---|---|---|
| EP | 2159471 A3 | * | 2/2011 |
| FR | 2986085 A1 | * | 7/2013 |
| GB | 2474048 A | * | 4/2011 |

*Primary Examiner* — Justin Larson
(74) *Attorney, Agent, or Firm* — Jason E. McKinnie; Gunn, Lee & Cave, P.C.

(57) ABSTRACT

An apparatus for holding electronic devices within view of a user without having to utilize the user's hands. The apparatus comprises a wearable base that extends around a user's torso and/or neck. A stand that comprises a frame, device holder and attachment member that is releasably attached into the base. The stand is capable of maneuvering the device through all range of motion to assist user in the viewing of the device without hands.

12 Claims, 5 Drawing Sheets

(56) References Cited

U.S. PATENT DOCUMENTS

| | | | |
|---|---|---|---|
| 7,448,812 B2 * | 11/2008 | Heibel | 396/419 |
| 7,665,641 B2 * | 2/2010 | Kaufman | 224/261 |
| 7,850,133 B2 * | 12/2010 | Carnevali | 248/205.5 |
| 8,109,421 B2 * | 2/2012 | Mclean et al. | 224/270 |
| 8,206,045 B2 * | 6/2012 | Sweeney et al. | 396/420 |
| 8,267,294 B2 * | 9/2012 | Yu et al. | 224/623 |
| 8,418,900 B1 * | 4/2013 | Baker | 224/262 |
| 8,505,790 B2 * | 8/2013 | Yu et al. | 224/185 |
| 8,881,961 B1 * | 11/2014 | Cibirka | 224/265 |
| D727,333 S * | 4/2015 | Shih et al. | D14/447 |
| 9,016,961 B2 * | 4/2015 | Hulse | 396/420 |
| 2004/0180631 A1 * | 9/2004 | Lim et al. | 455/90.3 |
| 2004/0211799 A1 * | 10/2004 | Loughman | 224/262 |
| 2007/0018064 A1 * | 1/2007 | Wang | 248/274.1 |
| 2007/0023594 A1 * | 2/2007 | Choi et al. | 248/205.5 |
| 2007/0164987 A1 * | 7/2007 | Graham | 345/156 |
| 2008/0173681 A1 * | 7/2008 | Robinson | 224/257 |
| 2013/0214022 A1 * | 8/2013 | Harvey | 224/623 |
| 2014/0231482 A1 * | 8/2014 | Chamberlayne | 224/623 |

* cited by examiner

ELECTRONIC DEVICE HOLDER

CROSS-REFERENCES TO RELATED APPLICATIONS

This application claims the benefit of U.S. provisional application Ser. No. 61/802,137 filed Mar. 15, 2013 entitled Electronic Device Accessory, which is incorporated by reference herein.

STATEMENT REGARDING FEDERALLY SPONSORED RESEARCH OR DEVELOPMENT

Not applicable.

BACKGROUND OF THE INVENTION

1. Field of the Invention

This invention relates to electronic device accessories, and more particularly, to a neck strap or harness with a built in electronic device holder that will allow users to have easy, usable, hands free access to and storage of the device and be able to utilize the device more effectively and safely.

2. Description of the Related Art

Electronic devices including but not limited to cellular phones, smart phones, PDA's, tablets, tablet PC's, electronic readers and other such devices have become a widely used means of communication, entertainment, and business in today's society. The physical use of these devices requires the device to be on a stable surface or in the user's hand(s). It is common practice for a person to use the device or check for new/recent activity numerous times within a short period of time. After each short use, the user tends to stow away the electronic device only to get it out again. The frequent and continual pattern of use, storage and retrieval causes individuals to have one or both hands occupied a majority of the time. This disarms the user from full function of their hands. Additionally, this repeated pattern results in the mishandling of the device and subsequent damage due to the mishandling.

Electronic device accessories exist on the market and are used to hold and protect your device in different ways namely to enclose your device within itself so that it will be protected and/or so that it that will clip to your belt or purse. There are also device holders that will hold your phone in your vehicle. There are also device lanyards or holder pockets, namely for smart phones, that go around your neck. There are also device stands. However none of the prior art devices allow for wearable use.

SUMMARY OF THE INVENTION

This disclosure departs from what is available on the market today by providing a wearable base that fills the need for active users of such devices to be able to use their device with reduced reliance on the device being held in their hands and as a result disarming the user from performing other important functions and compromising reaction times when the hands are needed for other actions and reduced risk of mishandling and damage to the device.

This disclosure provides a fast, easily accessible holder for small electronic devices such as a mobile phone, tablet, or music player. The electronic device holder consists of two parts, a stand holder that allows a user to modify the angle, rotation, and vertical position of the electronic device and base that attaches to a person. The stand is detachable from the base and may be used without the base as a general stand. When the stand is attached to the base, the user may enjoy the electronic device without having to use their hands.

DETAILED DESCRIPTION

Figure 1:
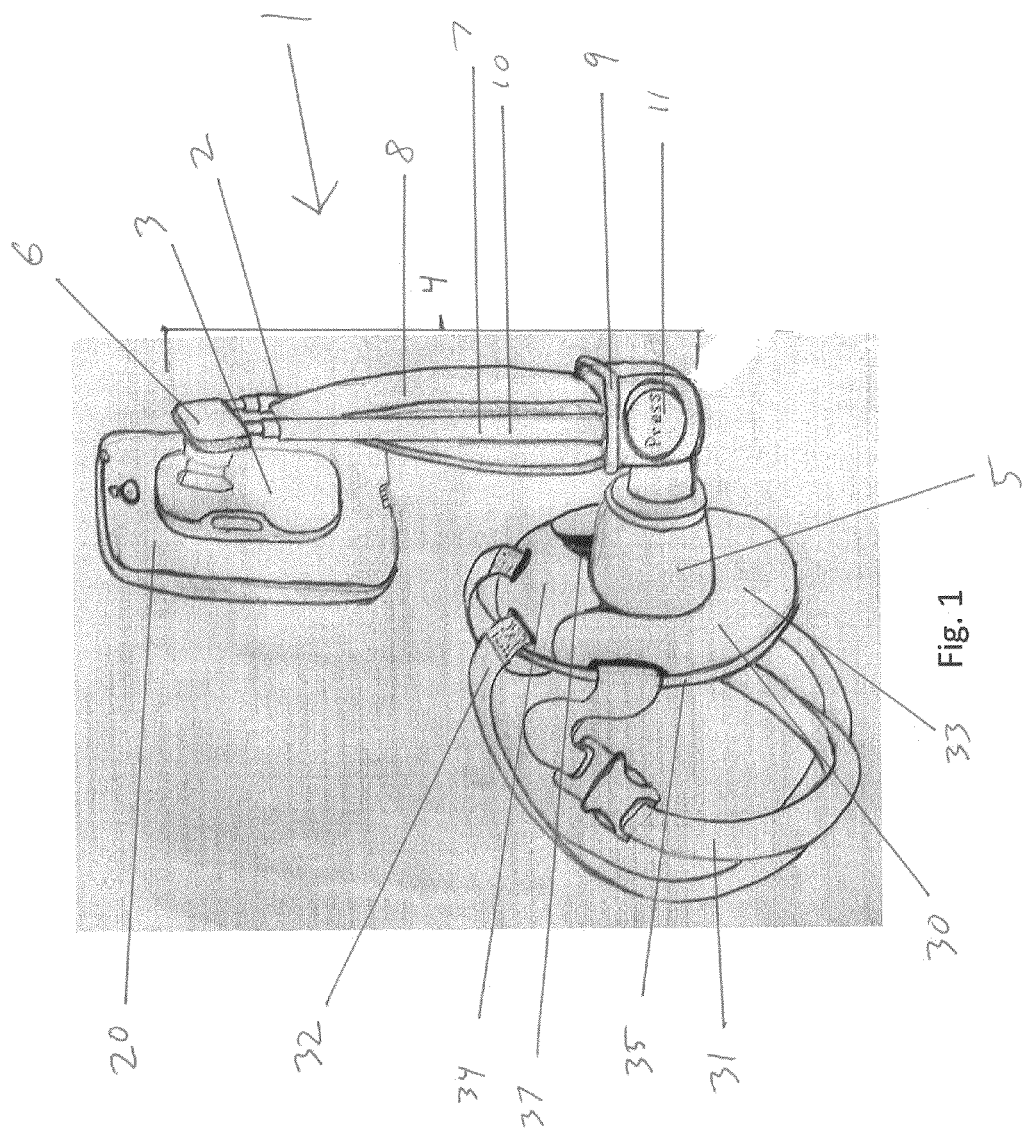
FIG. 1 is a profile view of the disclosed embodiment.

Referring to FIG. 1, the electronic device holder 1 is comprised of a stand portion 2 and a base 30. The stand portion 2 comprises a device holder 3, frame 4, and an attachment member 5 which may be removably inserted into the base 30. The base 30 is fitted with a torso strap 31 and neck strap 32 to aid in attachment to a person.

Referring to FIGS. 1-4, the frame 4 is connected on one end to a device holder 3 and on a second end to an attachment member 5. The frame 4 consists of a top frame member 6, telescoping element 7, support member 8, and pivot joint 9. The top frame member 6 is located at the top of the frame 4 and is connected to the telescoping element 7. The telescoping element 7 allows the frame 4 to lengthen or shorten based on the user's needs. The support member 8 is attached to the bottom telescoping receiving member 10 of the telescoping element 7 to provide additional support. The support member 8 and bottom telescoping receiving member 10 are attached to one end of the pivot joint 9. The pivot joint 9 is manually activated through pressing of the pivot joint release button 11.

The attachment member 5 is attached to the other end of the pivot joint 9 from the bottom telescoping receiving member 10 and support member 8. The attachment member 5 is comprised of a suction cup 12, flange 13, and screw mount 14. The screw mount 14 is directly attached to the pivot joint 9. The pivot joint 9 allows the device holder 3 and telescoping element 7 to rotate 180 degrees in respect to the attachment member 5.

Figure 3:
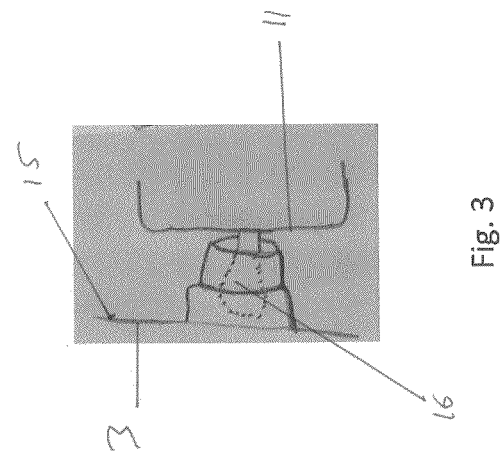
FIG. 3 is a close-up view of the pivot joint.
Figure 2:
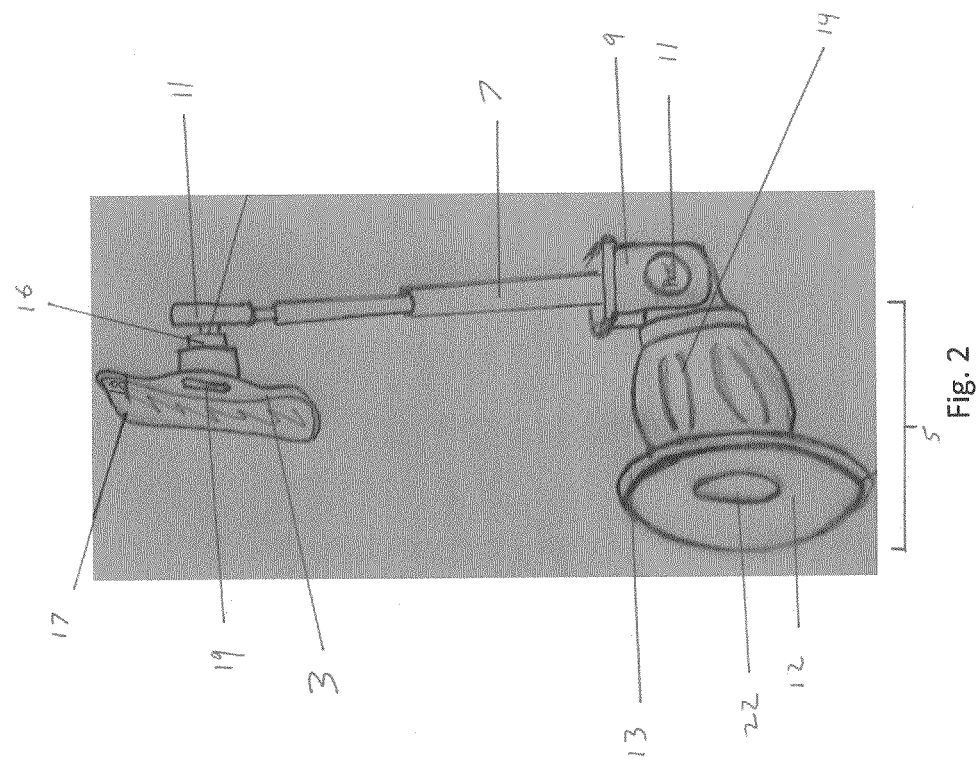
FIG. 2 is a side profile view of the stand portion of the disclosed embodiment without torso connection.

The device holder 3 is generally rectangular in shape. The device holder 3 is attached on its rear face 15 to the frame 3 through a ball and socket joint 16 that is attached to the top frame member 6. The ball and socket joint 16, as seen in FIG. 3, allows the device, holder 3 to rotate in a complete circle and be adjusted in all 360 degrees. Once a device is attached to the device holder 3, the device holder 3 may be moved by the user to achieve the desired viewing angle.

Electronic devices 20, such as tablets, music players, and mobile phones, are attached to the device holder 3 through a variety of attachment mechanisms. The front face 17 of the device holder 3 contains a sticky pad 18 that allows for attachment and removal of an electronic device without leaving any residue. Additionally, clips 19 positioned along the edges of the device holder 3 attach to an electronic device and secure it to the device holder 3. The specific device holder attachment mechanisms vary depending on the size, weight, and use of the electronic device. Additional attachment mechanisms such as elastic bands or fitted rubber sleeves may be utilized.

Attachment mechanisms may be used in unison or in combination to achieve sufficient level of attachment.

Figure 4:
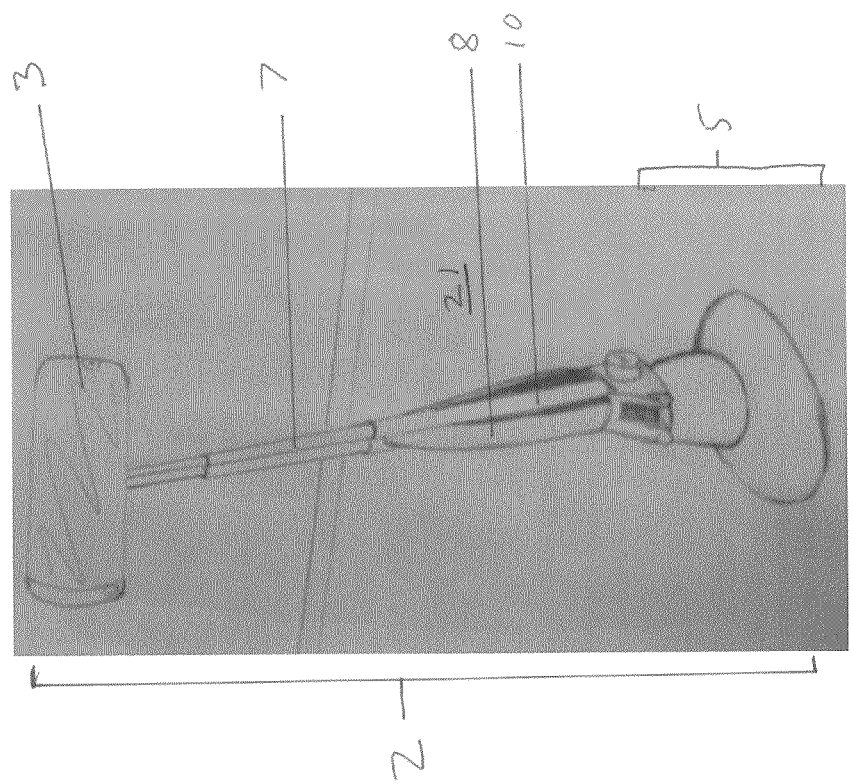
FIG. 4 is a profile view of the disclosed embodiment on a surface.

As seen in FIG. 4, the stand portion 2 may be mounted on any relatively flat surface 21. The suction cup 12 is firmly placed on the flat surface 21. When the screw mount 14 is screwed down, the flange 13 pushes on the suction cup 12 causing the center of the suction cup 22 to be pushed down to the flat surface 21. This creates a pressure differential with sufficient force to hold the stand 2 upright and keep it from falling over.

Figure 5:
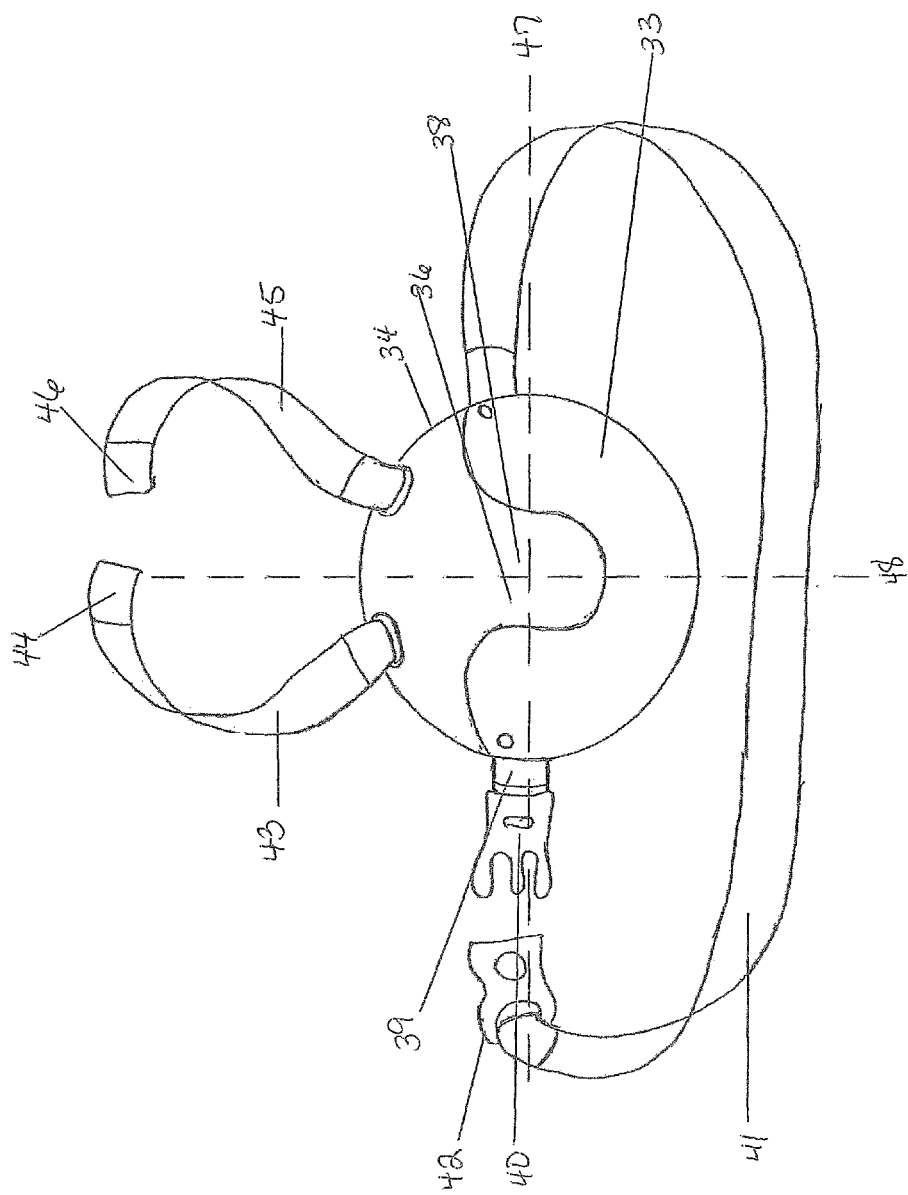
FIG. 5 is a top down view of the torso connection.

Referring to FIGS. 1 and 5, the base 30 is generally circular in shape and consists of hard shell having a front wall 33, back wall 34 and a side wall 35. The sidewall 35 encompasses approximately two thirds of the circular base creating an opening 36 at the top and shortened front wall 33 as compared to the back wall 34. A pocket 37 is formed by the front wall 33, back wall 34 and a side wall 35. A slot 38 is cut into the front wall and extends from the opening 36 to past the halfway point of the circular base 30. The pocket 37 is appropriately sized, height and width, to receive the suction cup 12 and flange 13 to create a frictional fit. The slot 38 is of sufficient size to accommodate the screw mount 14. In the disclosed embodiment, the stand portion 2 fits in the base 30 with sufficient friction fit to prevent small movements or gravity from dislodging the stand portion 2 from the base 30.

An adjustable torso strap 31 is comprised of a male strip 39 having a male clip 40 on one end and female strip 41 having a female clip 42 on one end. The other end of the male strip 39 is attached to the edge of base 30 at approximately the lateral axis 47 of the base. The other end of the female strip 41 is attached to the edge of base 30 at approximately the lateral axis 47 of the base 30, on the opposing side of where the male strip 39 attaches to the base 30. The male clip 40 corresponds to the female clip 42 and capable of locking. Other fasteners such as clips may be utilized.

An adjustable neck strap 32 is comprised of a right strip 43 having a hook and loop fastener 44 on one end and left strip 45 having a hook and loop fastener 46 on one end. The other end of the male strip 43 is attached to the back wall 34 of base 30 above the slot 38. The other end of the female strip 45 is attached adjacent to the where the male strip 43 attaches to the base 30 on the opposite side of the longitudinal axis 48 of base 30. The hook and loop fasteners 44, 46 are capable of attaching to one another and securing the right strip 43 with the left strip 45. Other fasteners such as clips may be utilized.

Figure 7:
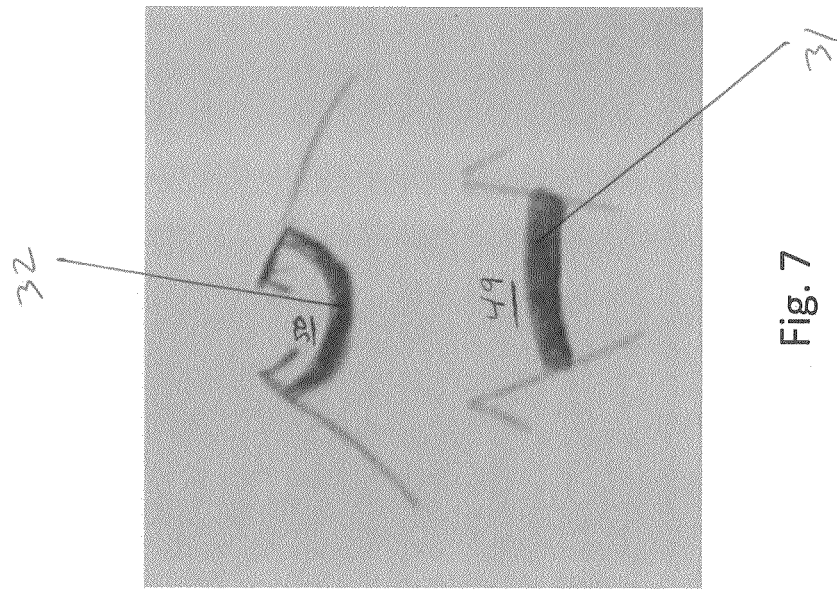
FIG. 7 is a back view of a person wearing the disclosed embodiment.
Figure 6:
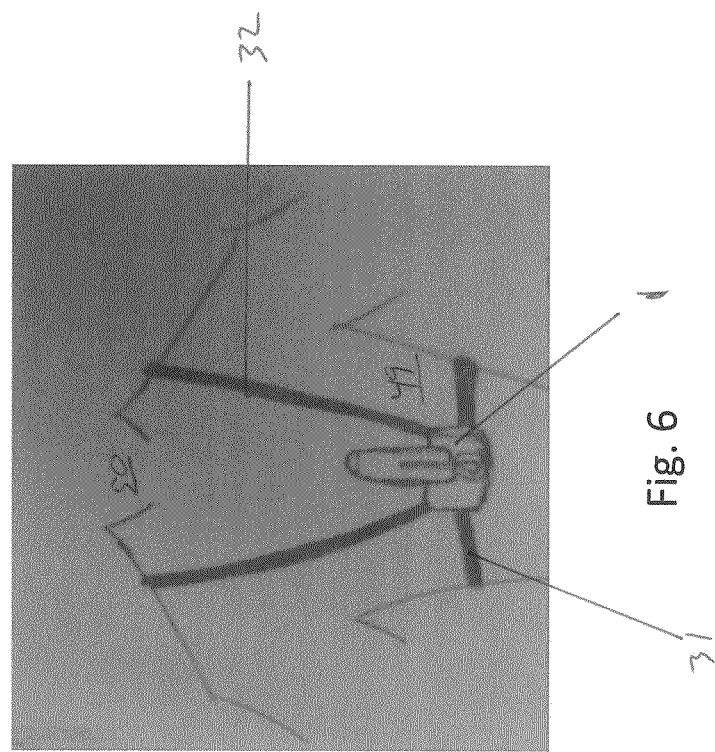
FIG. 6 is a front view of a person wearing the disclosed embodiment.

In operation and attached to a user as seen in FIGS. 6 and 7, the back wall 34 of the base 30 is placed against a person's chest or torso 49. The torso straps 39, 41 are positioned around the person's torso 49 and connected through the clips 40, 42. The neck straps 43, 45 are moved from the base 30 to extend behind the person's neck 50 and fastened with the hook and loop 44, 46. The torso strap 31 is to keep the base 30 against the person's torso 47 and the neck strap 32 is to assist in keeping the base 30 from moving up and down. The stand 2 is then inserted into the pocket 37. An electronic device 20 is attached to the device holder 3 and the person may then use the pivot joint 9, the telescoping element 7, an/or the ball and socket joint 16 to adjust the device holder 3 to ensure proper use of the electronic device while keeping their hands free for other activities.

I claim:

1. An electronic device holder comprising:
a base having at least one strap, a front portion having a slot, sidewalls, and a rear portion;
a stand comprising a frame, an attachment member, and a device holder;
wherein said stand is releasably attached to said base;
said attachment member further comprises a suction cup, flange and screw mount wherein said screw mount may rotationally compress said flange and said suction cup;
said attachment member is frictionally retained in said base; and
said at least one strap restrains said base against a person.

2. An electronic device holder as disclosed in claim 1 said frame further comprises a telescopic extension.

3. An electronic device holder as disclosed in claim 1 wherein said device holder has at least one clip.

4. An electronic device holder as disclosed in claim 1 wherein said device holder has a sticky pad.

5. An electronic device holder as disclosed in claim 1 wherein said device holder has at least one strap.

6. An electronic device holder as disclosed in claim 1 wherein said device holder is attached to said frame through a ball and socket joint.

7. An electronic device holder as disclosed in claim 1 wherein said frame and said attachment member are connected through a pivot joint.

8. An electronic device holder as disclosed in claim 1 wherein said at least one strap is a torso strap.

9. An electronic device holder as disclosed in claim 1 wherein said at least one strap is a neck strap.

10. An electronic device holder as disclosed in claim 1 wherein said at least one strap restrains said base against a person.

11. An electronic device holder as disclosed in claim 1 wherein said at least one strap is configured to wrap around a person's torso.

12. An electronic device holder as disclosed in claim 1 wherein said at least one strap is configured to wrap around a person's neck.

* * * * *